United States Patent
Roh et al.

(10) Patent No.: US 8,086,183 B2
(45) Date of Patent: Dec. 27, 2011

(54) APPARATUS AND METHOD FOR PERCEIVING AND REPORTING NEIGHBORHOOD OBJECT

(75) Inventors: Dong-hyun Roh, Suwon-si (KR); Seng-su Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1083 days.

(21) Appl. No.: 11/840,540

(22) Filed: Aug. 17, 2007

(65) Prior Publication Data
US 2008/0220724 A1 Sep. 11, 2008

(30) Foreign Application Priority Data
Mar. 6, 2007 (KR) .................... 10-2007-0022030

(51) Int. Cl.
*H04B 7/00* (2006.01)

(52) U.S. Cl. ....... 455/66.1; 455/421; 455/446; 455/418; 455/404.2; 455/414.2; 455/432.1; 455/404.1; 455/456.1; 455/456.2; 455/456.5

(58) Field of Classification Search .................. 455/421, 455/446, 418, 404.2, 414.2, 432.1, 404.1–2, 455/456.1–6; 715/747
See application file for complete search history.

(56) References Cited

U.S. PATENT DOCUMENTS

| 7,184,776 | B2 * | 2/2007 | Fauconnier ................ 455/456.1 |
| 2002/0063634 | A1 * | 5/2002 | Bredow et al. ........... 340/825.69 |
| 2004/0203408 | A1 | 10/2004 | Wen et al. |
| 2005/0096084 | A1 | 5/2005 | Pohja et al. |
| 2007/0026871 | A1 * | 2/2007 | Wager ......................... 455/456.1 |
| 2007/0064655 | A1 * | 3/2007 | Ruuska ......................... 370/332 |
| 2007/0178888 | A1 * | 8/2007 | Alfano et al. ............... 455/414.1 |
| 2008/0114829 | A1 * | 5/2008 | Button et al. ................. 709/203 |
| 2008/0287140 | A1 * | 11/2008 | Lee et al. .................... 455/456.2 |

FOREIGN PATENT DOCUMENTS

| JP | 2004-15654 | 1/2004 |
| KR | 2006-88757 | 8/2006 |

* cited by examiner

*Primary Examiner* — Kamran Afshar
*Assistant Examiner* — Edward Zhang
(74) *Attorney, Agent, or Firm* — NSIP Law (57) ABSTRACT

An apparatus and method for perceiving and reporting a neighborhood object, the apparatus including: a message analysis unit to analyze information of an alive message received from the neighborhood object and to determine if the analyzed information lies within a predetermined range; a neighborhood object information control unit to update status information of the neighborhood object by adjusting a transmission cycle, according to which the neighborhood object transmits the alive message, based on a result of the determination by the message analysis unit; and a reporting unit to report the updated status information of the neighborhood object according to a reporting condition.

18 Claims, 3 Drawing Sheets

APPARATUS AND METHOD FOR PERCEIVING AND REPORTING NEIGHBORHOOD OBJECT

CROSS-REFERENCE TO RELATED APPLICATION

This application claims all benefits accruing under 35 U.S.C. §119 from Korean Patent Application No. 2007-22030 filed on Mar. 6, 2007 in the Korean Intellectual Property Office, the disclosure of which is incorporated herein by reference.

BACKGROUND OF THE INVENTION

1. Field of the Invention

Aspects of the present invention relate generally to an apparatus and method for perceiving and reporting a neighborhood object (animate or inanimate thing), and more particularly, to an apparatus and method for rapidly perceiving a neighborhood object entering, residing in, or leaving a neighborhood area in a mobile environment, and reporting information on the perceived neighborhood object according to various reporting conditions.

2. Related Art

According to a conventional method of perceiving and reporting a neighborhood object in a mobile environment, a central server provides information on neighborhood objects based on terminal location information. This method is commonly and widely applied in a service called "find a friend."

According to such a method, in a state where a plurality of mobile communication terminals are located within the same base station area, a user accesses a mobile site that provides a same location reporting service by using a first mobile communication terminal. Then, the user registers/stores information on other target parties for the same location reporting service.

Specifically, the information that the user inputs includes names and phone numbers of the plurality of target parties (e.g., family, friends, schoolmates, colleagues, etc.) to thereby register/store the information. If the user requests approval for using the same location reporting service through the first mobile communication terminal, then a data processor/manager stores the information on the plurality of other target parties, transmitted from the first mobile communication terminal, in a database (DB). Then, the data processor/manager searches for numbers of second mobile communication terminals located in the same location (specified location) or locations within a certain distance.

That is, a same location reporting controller first stores information on the registered first and second mobile communication terminals in the DB in real time. Then, the same location reporting controller performs a real-time search for the second mobile communication terminals near locations within the same base station area according to given conditions by making reference to the stored information. When at least one of the second mobile communication terminals is near the same location, the same location reporting controller sends a short message service (SMS) text message to the first mobile communication terminal.

However, in perceiving and reporting a neighborhood object in the manner as described, there is an inconvenience in that a mobile communication service must be used. Moreover, there is a problem in that when there are many users, the speed of perceiving a neighborhood object is slow because a central server is commonly used by the many users. Furthermore, because information on a perceived neighborhood object is not reported in consideration of various situations, but according to a system default condition through simple perception, there is another inconvenience in that a user must occasionally manually manage and set a reporting condition for neighborhood situations.

SUMMARY OF THE INVENTION

Aspects of the present invention provide an apparatus and method for perceiving and reporting a neighborhood object, which can rapidly perceive neighborhood objects entering, residing in, and leaving a neighborhood area. Aspects of the present invention also provide an apparatus and method for reporting information on a perceived neighborhood object to a user according to various reporting conditions.

Additional aspects and/or advantages of the invention will be set forth in part in the description which follows and, in part, will be obvious from the description, or may be learned by practice of the invention.

In accordance with an example embodiment of the present invention, there is provided an apparatus for perceiving and reporting a neighborhood object located within a neighborhood area. Such an apparatus includes: a message analysis unit to analyze information of an alive message received from the neighborhood object and to determine if the neighborhood object is located within a predetermined range inside the neighborhood area; a neighborhood object information control unit to update status information on a location of the neighborhood object by adjusting a transmission cycle, according to which the neighborhood object transmits the alive message, based on a result of the determination by the message analysis unit; and a reporting unit to report the updated status information of the neighborhood object according to a reporting condition.

In accordance with another example embodiment of the present invention, there is provided a method of perceiving and reporting a neighborhood object located within a neighborhood area. Such a method includes: analyzing information of an alive message received from the neighborhood object and determining if the neighborhood object is located within a predetermined range; updating status information on a location of the neighborhood object by adjusting a transmission cycle, according to which the neighborhood object transmits the alive message, based on a result of a determination of whether the neighborhood object is located within the predetermined range; and reporting the updated status information of the neighborhood object according to a reporting condition.

In accordance with another example embodiment of the present invention, there is provided a method of perceiving and reporting a neighborhood object's entrance into a neighborhood area. Such a method includes: analyzing information of an alive message received from the neighborhood object to determine if the neighborhood object is newly entered into the neighborhood area; recording status information on a location of the neighborhood object based on the information of the alive message if the neighborhood object is newly entered into the neighborhood area; updating the status information of the neighborhood object based on the information of the alive message if the neighborhood object is not newly entered into the neighborhood area; and reporting the status information of the neighborhood object.

In accordance with another example embodiment of the present invention, there is provided a method of perceiving and reporting a neighborhood object's departure from a neighborhood area. Such a method includes: analyzing information of an alive message received from the neighborhood object to compare the analyzed information with a threshold value; adjusting a transmission cycle, according to which the neighborhood object transmits the alive message, based on a comparison of the analyzed information with the threshold value; determining that the neighborhood object has departed from the neighborhood area after the alive message is not received according to the adjusted transmission cycle; updating a status information on a location of the neighborhood object when it is determined that the neighborhood object departs from the neighborhood area; and reporting the status information of the neighborhood object.

In accordance with another example embodiment of the present invention, there is provided an apparatus for perceiving and reporting a neighborhood object located within a neighborhood area. Such an apparatus includes: a message analysis unit to analyze information of an alive message received from the neighborhood object and to determine if the analyzed information is newly entered into the neighborhood area; a neighborhood object information control unit to update status information on a location of the neighborhood object based on the information of the alive message if the neighborhood object is not newly entered into the neighborhood area, and to record status information on a location of the neighborhood object based on the information of the alive message if the neighborhood object is newly entered into the neighborhood area; and a reporting unit to report the status information of the neighborhood object.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Here, it should be understood that combinations of each block and each operation of the attached block diagrams and flowcharts may be executed according to computer program instructions. Since such computer program instructions may be loaded into a processor of a general-purpose computer, a special-purpose computer, or other programmable data processing equipment, the instructions to be executed through the processor of the computer or other programmable data processing equipment create methods and/or devices for executing the functions described in each block or each operation of the block diagrams or the flowcharts. These computer program instructions may be stored in a computer-usable or computer-readable memory, capable of being directed to a computer or other programmable data processing equipment, in order to implement such functions in a specific manner, so it is also possible to produce a system including instructions for executing the functions described in each block or each operation of the block diagrams or the flowcharts by means of the instructions stored in the computer-usable or computer-readable memory. Since the computer program instructions may be loaded into a computer or other programmable data processing equipment, it is also possible to provide stages for executing the functions described in each block or each operation of the block diagrams or the flowcharts by methods of the instructions which operate the computer or other programmable data processing equipment by executing a series of operational stages in the computer or other programmable data processing equipment to generate a computer-executed process.

Also, each block or each operation may represent a part of a module, a segment or a code, including one or more executable instructions for executing a specific logical function or specific logical functions. In addition, it should be noted that the functions mentioned in the blocks or operations may occur out of order in several alternative embodiments. For example, two blocks or operations shown in succession may be executed substantially concurrently, or may be executed in reverse order according to corresponding functions.

Figure 1:
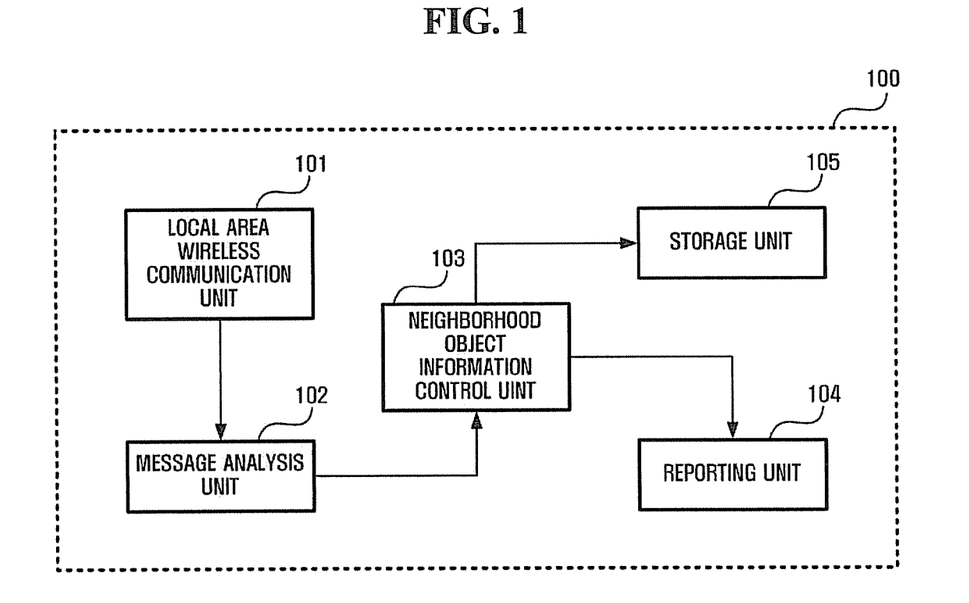
FIG. 1 is a block diagram illustrating an apparatus for perceiving and reporting a neighborhood object according to an example embodiment of the present invention.

FIG. 1 illustrates an apparatus for perceiving and reporting a neighborhood object according to an example embodiment of the present invention. The apparatus 100 for perceiving and reporting a neighborhood object includes a local area wireless communication unit 101 (for example, a radio unit), a message analysis unit 102, a neighborhood object information control unit 103, a reporting unit 104, and a storage unit 105. The local area wireless communication unit 101 transmits and/or receives messages to/from neighborhood objects. The message analysis unit 102 analyzes information of a message received from a neighborhood object through the local area wireless communication unit 101 and determines a status of the corresponding object based on the analyzed information. The neighborhood object information control unit 103 updates status information of the corresponding object according to the status determined by the message analysis unit 102. The reporting unit 104 reports status information of the corresponding object, which is updated by the neighborhood object information control unit 103, according to a reporting condition. The storage unit 105 stores the status information of the corresponding object and information on the reporting condition. The reporting condition may be input by a user. The apparatus may be, for example, a mobile phone or a laptop computer.

Each of the above-mentioned units according to the example embodiment of the present invention may be a software element or a hardware element, such as a Field Programmable Gate Array (FPGA) or an Application Specific Integrated Circuit (ASIC), that performs a predetermined function. However, it is understood that the unit or module is not limited to software or hardware. For example, the unit may be constructed either to be stored in an addressable storage medium or to execute one or more processors. Therefore, the unit includes, for example, software elements, object-oriented software elements, class elements or task elements, processes, functions, properties, procedures, sub-routines, segments of a program code, drivers, firmware, microcodes, circuits, data, database, data structures, tables, arrays, and parameters. The elements and functions provided by the units may be either combined into a smaller number of elements or units or divided into a larger number of elements or units.

It is understood that a neighborhood object, as used herein, is a device existing within the coverage of a wireless communication protocol and transmitting an alive message in a given cycle. That is, the neighborhood is not limited to the physical area of a neighborhood, but as used herein refers to a coverage area of a wireless communication protocol. According to aspects of the present invention, it will be assumed that all neighborhood objects interact with each other (i.e., multicast-transmit alive messages with a regular cycle) in order to inform other devices that they are in operation.

Reference will now be made to a situation where the apparatus 100 illustrated in FIG. 1 perceives and reports a neighborhood object entering and residing in a neighborhood area. Referring to FIG. 1, the message analysis unit 102 analyzes information of an alive message received from a neighborhood object through the local area wireless communication unit 101. Then, based on the analyzed information, the message analysis unit 102 determines whether the neighborhood object transmitting the alive message is an existing resident object or a new object (i.e., an object newly entering a neighborhood area). The alive message may be, for example, any one or more of a receive sensitivity, a transmission cycle, a message retransmission frequency, and neighborhood object identification information.

The neighborhood object information control unit 103 updates status information of the neighborhood object according to the determination of the message analysis unit 102. Here, the status information of the neighborhood object may be any one or more of information about whether the neighborhood object has entered the neighborhood area, when the neighborhood object has entered the neighborhood area, whether the neighborhood object has resided in the neighborhood area, how long the neighborhood object has resided in the neighborhood area, whether the neighborhood object has left the neighborhood area, and when the neighborhood object has left the neighborhood area.

According to an aspect of the present invention, a first neighborhood object that stores status information on a second neighborhood object can share the status information on the second neighborhood object with a third neighborhood object. For example, the first neighborhood object may share the status information on the second neighborhood object with the third neighborhood object at the request of the third neighborhood object.

From the viewpoint of the third neighborhood object, when the first neighborhood object determined by the message analysis unit 102 of the third neighborhood object is newly entering the neighborhood area, the neighborhood object information control unit 103 of the third neighborhood object receives a response message to a request sent to the first neighborhood object, and records status information of the first neighborhood object (for example, the first neighborhood object's entering time into the neighborhood area and the first neighborhood object's identification information) in the storage unit 105 of the third neighborhood object.

If the first neighborhood object stores status information of the second neighborhood object, the neighborhood object information control unit 103 of the third neighborhood object determines whether to request the status information of the second neighborhood object stored by the first neighborhood object. If the neighborhood object information control unit 103 determines to request the status information of the second neighborhood object, the neighborhood object information control unit 103 transmits a request message requesting the first neighborhood object to send the status information of the second neighborhood object. However, it is understood that according to other aspects, the neighborhood object information control unit 103 does not determine if the first neighborhood object stores status information of the second neighborhood object, and does not request the first neighborhood object to send the status information of the second neighborhood object. That is, the neighborhood object information control unit 103 only obtains status information of a neighborhood object directly from the neighborhood object.

Subsequently, the neighborhood object information control unit 103 of the third neighborhood object receives a response message to the request sent to the first neighborhood object, and records the status information of the second neighborhood object (for example, the second neighborhood object's entering time into the neighborhood area and the second neighborhood object's identification information) in the storage unit 105 of the third neighborhood object.

Furthermore, the neighborhood object information control unit 103 of the third neighborhood object may perform an operation of checking if the second neighborhood object actually exists in the neighborhood area. Specifically, the neighborhood object information control unit 103 of the third neighborhood object may transmit a message to the second neighborhood object by referring to the status information of the second neighborhood object (for example, the second neighborhood object's identification information). Then, upon receiving a response message from the second neighborhood object, the third neighborhood object determines that the second neighborhood object exists in the neighborhood area.

If the neighborhood object information control unit 103 of the third neighborhood object does not receive a response message from the second neighborhood object after a predetermined time elapses, the third neighborhood object determines that the second neighborhood object does not exist in the neighborhood area. Accordingly, the neighborhood object information control unit 103 may not record the status information of the second neighborhood object in the storage unit 105.

There are a variety of methods to determine whether to request neighborhood object information of a new neighborhood object entering the neighborhood area. For example, when a new neighborhood object entering the neighborhood area is perceived in a state where no neighborhood object information is stored in the storage unit 105, the neighborhood object information control unit 103 may request neighborhood object information (such as status information) of other neighborhood objects stored by the corresponding object.

Also, even if neighborhood object information is stored in the storage unit 105, when a new neighborhood object enters the neighborhood area after a given time elapses in a state that no new neighborhood object is additionally perceived, the neighborhood object information control unit 103 may request neighborhood object information of other neighborhood objects from the corresponding object, as described above.

The reporting unit 104 reports the status information of the corresponding object, which has been updated through the neighborhood object information control unit 103, according to various reporting conditions. Accordingly, the reporting unit 104 can rapidly acquire and report neighborhood object information when a new neighborhood object enters a neighborhood area. However, it is understood that according to other aspects, the reporting unit 104 reports the status information when manually requested by a user, or automatically (with no reference to reporting conditions) when the status information is recorded or updated.

Reference will now be made to a situation where the apparatus 100 illustrated in FIG. 1 perceives and reports a neighborhood object in a neighborhood area leaving the neighborhood area. Referring to FIG. 1, the message analysis unit 102 analyzes information of an alive message received from a neighborhood object through the local area wireless communication unit 101, and determines if the analyzed information lies within a given range. The alive message may be, for example, any one or more of a receive sensitivity, a transmission cycle, a message retransmission frequency, and neighborhood object identification information.

The message analysis unit 102 compares the receive sensitivity of the received alive message with a threshold value. When the receive sensitivity does not exceed the threshold value, the message analysis unit 102 determines if the corresponding object leaves a neighborhood area. Specifically, the receive sensitivity of a radio wave is lowered when a neighborhood object is located at a boundary of a coverage area of the local area wireless communication unit 101. As a result, when the receive sensitivity is lowered, the probability of disconnecting from the neighborhood object is high. Thus, the message analysis unit 102 measures the receive sensitivity of an alive message, compares the measured receive sensitivity with a threshold value, and then determines if a corresponding object leaves a neighborhood area based on the comparison.

Then, the neighborhood object information control unit 103 updates status information of the neighborhood object according to the determination of the message analysis unit 102. The neighborhood object information control unit 103 may update the status information by requesting the corresponding object to adjust its alive message transmission cycle. In particular, if the message analysis unit 102 determines that a neighborhood object is likely to leave a neighborhood area based on a comparison between the receive sensitivity and the threshold value, the neighborhood object information control unit 103 may transmit, through the local area wireless communication unit 101, a message requesting the corresponding object to adjust a transmission cycle of an alive message so as to be shorter than a previous transmission cycle.

Upon receiving the request message from the neighborhood object information control unit 103, the corresponding object adjusts the transmission cycle of an alive message so as to be shorter than the previous transmission cycle. Accordingly, the corresponding object transmits an alive message based on the adjusted cycle to the apparatus 100 illustrated in FIG. 1. Because the adjusted transmission cycle of an alive message is shorter than the previous transmission cycle it is possible to more rapidly perceive the corresponding object leaving the neighborhood area.

When the corresponding object leaves the neighborhood area, the neighborhood object information control unit 103 updates status information of the corresponding object (i.e., information on whether the corresponding object has left the neighborhood area, information on when the corresponding object has left the neighborhood area, and/or information on how long the corresponding object has resided in the neighborhood area), and stores the updated status information in the storage unit 105.

If the receive sensitivity of an alive message from a neighborhood object that had been lower than the threshold value increases above the threshold value again, and the message analysis unit 102 detects this, the neighborhood object information control unit 103 may request the corresponding object to change the transmission cycle of an alive message to a predetermined value. Upon receiving the request from the message analysis unit 102, the corresponding object changes the transmission cycle of an alive message to the predetermined value.

The transmission cycle of an alive message may be adjusted by the corresponding object changing the transmission cycle to a predetermined value, or may be adjusted by a requester (for example, the neighborhood object information control unit 103) changing the transmission cycle to a desired cycle. For example, the requester may change the transmission cycle to a minimum cycle from among requested transmission cycles.

It is understood that methods and characteristics other than a receive sensitivity may be used as a criterion for determining if a corresponding object leaves a neighborhood area. For example, according to other aspects, a retransmission frequency included in an alive message may alternatively or additionally be used as a criterion for determining if a corresponding neighborhood object leaves a neighborhood area. That is, if there is a threshold value for a retransmission frequency, and the retransmission frequency of an alive message from a neighborhood object is equal to or greater than the threshold value, the message analysis unit 102 determines that the corresponding object is likely to leave a neighborhood area. In addition, other types of information may be used as a criterion for determining if a neighborhood object leaves a neighborhood area.

The reporting unit 104 reports the status information of the neighborhood object that has been updated through the neighborhood object information control unit 103 according to a reporting condition.

Status information, according to aspects of the present invention, may be acquired directly from the storage unit 105 in which the status information is stored. Alternatively, according to other aspects, a reporting condition is stored in the storage unit 105, and the status information is reported when the reporting condition is satisfied. However, it is understood that according to other aspects, the reporting unit 104 reports the status information automatically (with no reference to reporting conditions) when the status information is recorded or updated.

The reporting condition may be prepared based on neighborhood object information. For example, the reporting condition may stipulate: reporting when all of a plurality of one or more specified neighborhood objects enter or reside in a neighborhood area; reporting when any one of a plurality of one or more neighborhood objects enters or resides in a neighborhood area; reporting when any one of neighborhood objects entering or residing in a neighborhood area is not included in a plurality of one or more specified neighborhood objects; reporting when all of a plurality of one or more specified neighborhood objects leaves a neighborhood area; reporting when any one of a plurality of one or more specified neighborhood objects leaves a neighborhood area; and/or reporting when a plurality of one or more specified neighborhood objects reside in a neighborhood area for at least a given time period.

According to aspects of the present invention, various other reporting conditions may be created by utilizing information regarding entrance/residence/departure of neighborhood objects into/in/from a neighborhood area. Since a user is informed of a neighborhood activity of interest (as specified in a reporting condition) when the activity occurs, the user need not continuously make manual determinations on neighborhood activities.

Figure 2:
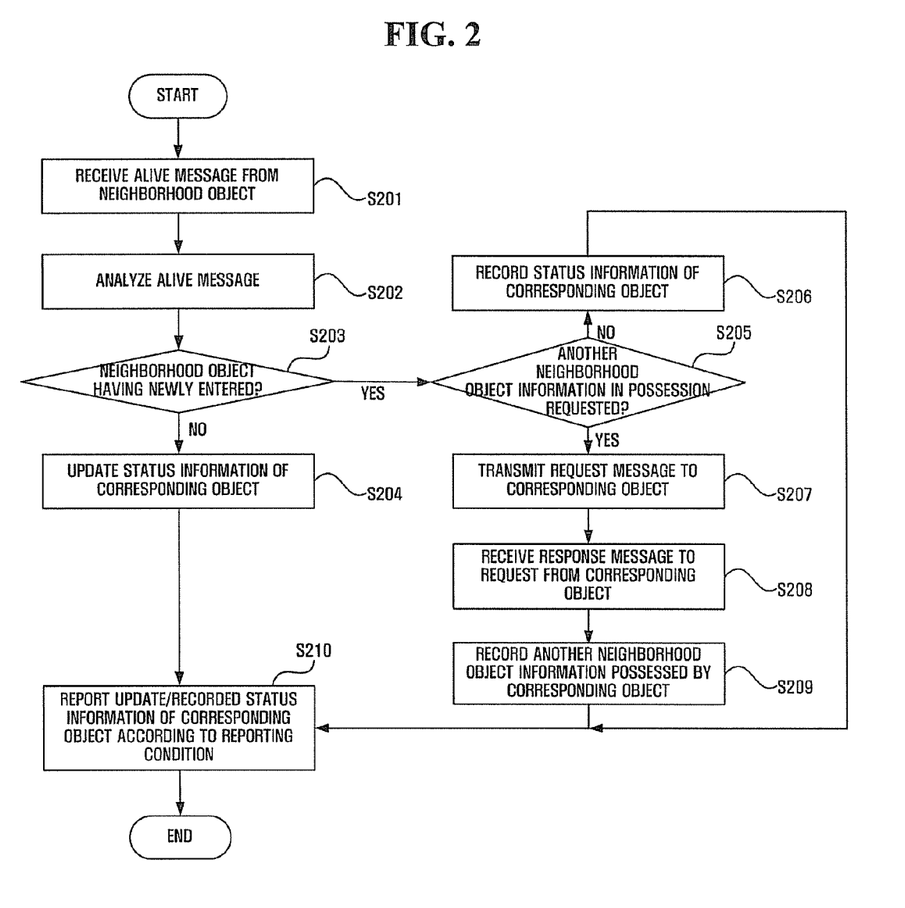
FIG. 2 is a flowchart illustrating a method of perceiving and reporting a neighborhood object's entrance into and residence in a neighborhood area according to an example embodiment of the present invention.

FIG. 2 illustrates a method of perceiving and reporting a neighborhood object's entrance into and residence in a neighborhood area according to an example embodiment of the present invention. Referring to FIGS. 1 and 2, the local area wireless communication unit 101 first receives an alive message from a neighborhood object in operation S201. The alive message may be, for example, any one or more of a receive sensitivity, a transmission cycle, a message retransmission frequency, and neighborhood object identification information.

After receiving the alive message (operation S201), the message analysis unit 102 analyzes information of the alive message in operation S202. Based on the analyzed information, the message analysis unit 102 determines whether the neighborhood object transmitting the alive message is an existing resident object (i.e., a resident object) or a new object (i.e., an object newly entering a neighborhood area) in operation S203.

If the neighborhood object is a resident neighborhood object, the neighborhood object information control unit 103 updates status information of the corresponding object in operation S204. The status information of the neighborhood object may be, for example, any one or more of: information on whether the neighborhood object has entered the neighborhood area, information on when the neighborhood object has entered the neighborhood area, information on whether the neighborhood object has resided in the neighborhood area, information on how long the neighborhood object has resided in the neighborhood area, information on whether the neighborhood object has left the neighborhood area, and information on when the neighborhood object has left the neighborhood area.

If the neighborhood object is an object newly entering the neighborhood area, the neighborhood object information control unit 103 determines whether to request neighborhood object information of one or more other neighborhood objects stored by the corresponding object in operation S205.

When the neighborhood object information control unit 103 determines not to request neighborhood object information of other neighborhood objects stored by the corresponding object (operation S205), the neighborhood object information control unit 103 records the status information of the corresponding object in the storage unit 105 in operation S206.

If the neighborhood object information control unit 103 determines to request neighborhood object information of one or more other neighborhood objects stored by the corresponding object (operation S205), the neighborhood object information control unit transmits a request message requesting the corresponding object to send the neighborhood object information of the other neighborhood objects stored therein in operation S207.

Then, neighborhood object information control unit 103 receives a response message to the request message from the corresponding object in operation S208. The neighborhood control unit 103 records status information of the one or more other neighborhood objects (such as the other neighborhood object's entering time into the neighborhood area and the other neighborhood object's identification information) in the storage unit 105 in operation S209.

It is understood that, according to aspects of the present invention, when the neighborhood object information control unit 103 requests neighborhood object information of one or more other neighborhood objects stored by the corresponding object, the neighborhood object information control unit 103 may first check if the one or more other neighborhood objects actually exist in the neighborhood area.

Once the status information and/or neighborhood object information has been updated (operation S204), or recorded (operation S206 or operation S209), the reporting unit 104 reports the status information of the corresponding object that has been updated through the neighborhood object information control unit 103 according to one or more reporting conditions in operation S210. Accordingly, the apparatus 100 can rapidly acquire and report neighborhood object information when a new neighborhood object enters a neighborhood area. However, it is understood that according to other aspects, the reporting unit 104 reports the status information when manually requested by a user, or automatically (with no reference to reporting conditions) when the status information is recorded or updated. A detailed description of the various reporting conditions will be given below with reference to FIG. 3.

Figure 3:
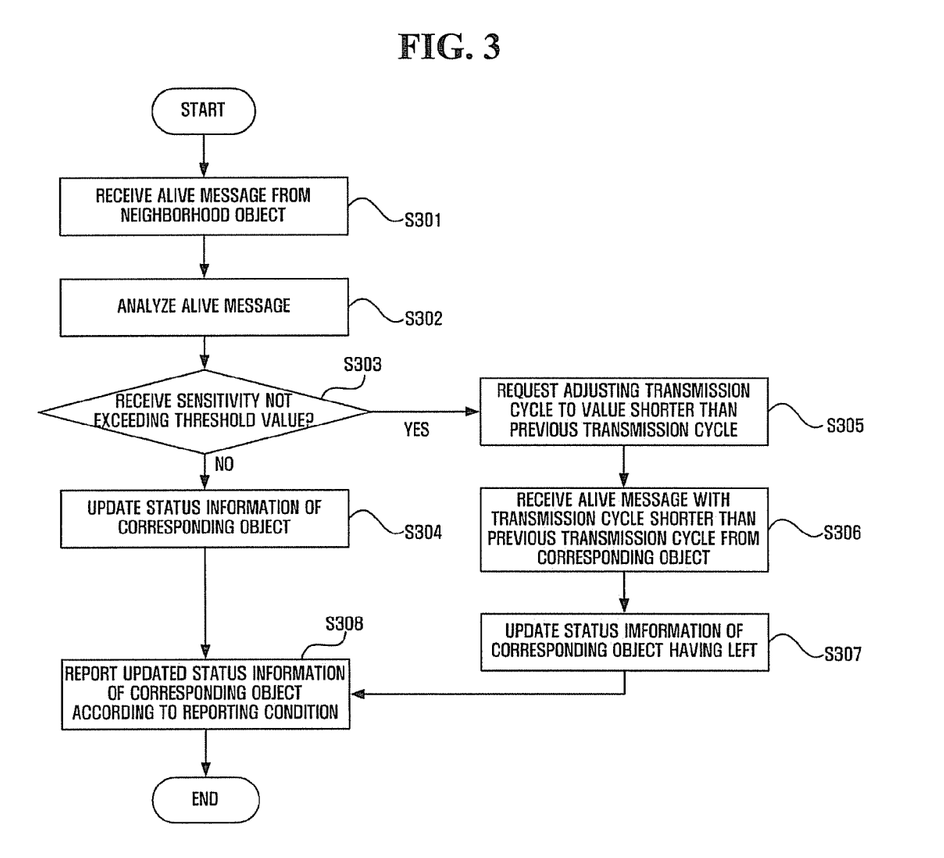
FIG. 3 is a flowchart illustrating a method of perceiving and reporting a neighborhood object's departure from a neighborhood area according to an example embodiment of the present invention.

FIG. 3 illustrates a method of perceiving and reporting a neighborhood object's departure from a neighborhood area in according to an example embodiment of the present invention. Referring to FIGS. 1 and 3, the local area wireless communication unit 101 first receives an alive message from a neighborhood object in operation S301. The alive message may be, for example, any one or more of a receive sensitivity, a transmission cycle, a message retransmission frequency, and neighborhood object identification information.

The message analysis unit 102 analyzes information of the alive message received through the local area wireless communication unit 101 in operation S302. Then, the message analysis unit 102 determines if the analyzed information lies within a given threshold value in operation S303. The message analysis unit 102 compares the receive sensitivity of the received alive message with the threshold value. Accordingly, when the receive sensitivity does not exceed the threshold value, the message analysis unit 102 determines if the corresponding object leaves a neighborhood area.

It is understood that, according to an aspect of the present invention, a retransmission frequency included in the alive message may be used as a criterion for determining if the corresponding neighborhood object leaves the neighborhood area. That is, if there is a threshold value for a retransmission frequency, and the retransmission frequency of an alive message from a neighborhood object is equal to or greater than the threshold value, the message analysis unit 102 determines that the corresponding object is likely to leave a neighborhood area. According to other aspects, other information may be used as a criterion for determining if a neighborhood object leaves a neighborhood area.

If the analyzed information exceeds the threshold vale (operation S303), the neighborhood object information control unit 103 updates status information of the neighborhood object in operation S304.

If the analyzed information does not exceed the threshold value (operation S303), and the message analysis unit 102 determines that the neighborhood object is likely to leave the neighborhood area. Accordingly, the neighborhood object information control unit 103 transmits a message to the corresponding object requesting that the corresponding object adjusts a transmission cycle of an alive message to be shorter than a previous transmission cycle in operation S305.

Upon receiving the request message from the neighborhood object information control unit 103 in operation S305, the corresponding object adjusts the transmission cycle of an alive message to be shorter than the previous transmission cycle, and transmits an alive message according to the adjusted cycle in operation S306.

According to an aspect of the present invention, when the receive sensitivity of an alive message from the corresponding object that is lower than the threshold value increases above the threshold value again, the neighborhood object information control unit 103 requests the corresponding object to change the transmission cycle of an alive message to a predetermined value. Upon receiving the request from the neighborhood object information control unit 103, the corresponding object changes the transmission cycle of an alive message to the predetermined value. It is understood that according to other aspects, the transmission cycle is adjusted (or re-adjusted) according to other methods, such as a neighborhood object changing a transmission cycle of the alive message automatically (i.e., without receiving a request message) upon the neighborhood object detecting the neighborhood object is leaving the neighborhood area of another neighborhood object. Furthermore, according to other aspects, when the receive sensitivity of an alive message from the corresponding object that is lower than the threshold value increases above the threshold value again, the neighborhood object information control unit 103 allows the transmission cycle to remain the same.

The transmission cycle of an alive message may be adjusted by a corresponding object changing the transmission cycle to a predetermined value, or may be adjusted by a requester (such as the neighborhood object information control unit 103) changing the transmission cycle to a desired cycle. For example, the requester may change the transmission cycle to a minimum cycle from among requested transmission cycles.

Because the transmission cycle of an alive message is adjusted shorter than the previous transmission cycle, as mentioned above, it is possible to more rapidly perceive the corresponding object leaving the neighborhood area.

If the corresponding object does leave the neighborhood area, the neighborhood object information control unit 103 updates status information of the corresponding object (for example, information on whether the corresponding object has left the neighborhood area, information on when the corresponding object has left the neighborhood area, and/or information on how long the corresponding object has resided in the neighborhood area) stored in the storage unit 105 in operation S307.

After the status information has been updated (operation S304 or operation S307), the reporting unit 104 reports the status information of the neighborhood object that has been updated through the neighborhood object information control unit 103 according to a reporting condition in operation S308. However, it is understood that according to other aspects, the reporting unit 104 reports the status information when manually requested by a user, or automatically (with no reference to reporting conditions) when the status information is recorded or updated.

The reporting condition may be prepared based on neighborhood object information (such as the status information). For example, the recording condition may stipulate: reporting when all of a plurality of one or more specified neighborhood objects enter or reside in a neighborhood area; reporting when any one of a plurality of one or more neighborhood objects enters or resides in a neighborhood area; reporting when any one of neighborhood objects entering or residing in a neighborhood area is not included in a plurality of one or more specified neighborhood objects; reporting when all of a plurality of one or more specified neighborhood objects leaves a neighborhood area; reporting when any one of a plurality of one or more specified neighborhood objects leaves a neighborhood area; and/or reporting when a plurality of one or more specified neighborhood objects reside in a neighborhood area for at least a given time period.

According to aspects of the present invention, various other reporting conditions may be created by utilizing information regarding entrance/residence/departure of neighborhood objects into/in/from a neighborhood area. Since a user is informed of a neighborhood activity of interest (as specified in a reporting condition) when the activity occurs, the user need not continuously make manual determinations on neighborhood activities.

According to aspects of the present invention as described above, one or more of the following effects can be obtained. First, if aspects of the present invention are additionally used in an alarm service based on neighborhood situation (or activity) information (such as time, location, etc.), the alarm service based on neighborhood situation information can be implemented in an ad-hoc manner. For example, a message that a user wants to say to the user's friend and is previously stored in a mobile device can be reported to the friend when the friend enters the neighborhood area, the approach of a person that a user wants to avoid can be reported to the user, any one of neighborhood persons leaving a neighborhood area can be reported to a user, and so forth.

Furthermore, when an image or a moving picture is photographed by means of a digital imaging apparatus capable of storing time information, location information, and neighborhood object identification information together, an information tagging service for neighborhood persons can be provided in which various applications are possible by using the neighborhood object identification information. For example, only an object of interest is stored, an image or a moving picture is stored only when specific neighborhood persons are located in a neighborhood area, and so forth.

Moreover, in a ubiquitous post-it service in which if a user leaves a digital post-it in a space under the control of a local server, other users entering the space can view the post-it left in the space, the user can specify the other users entitled to view the post-it when the user leaves the post-it, and, in particular, can specify various viewing conditions. For example, the user can allow other users to view the post-it only when at least a specified user joins them, only when a specified user is absent, only when the user is present in the space, only when the user is absent from the space, and so forth.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the status information may be reported to a user when the user manually requests the status information or automatically when the status information is updated, without referring to reporting conditions. Furthermore, the neighborhood object information control unit may not request the status information of other neighborhood objects stored in a detected neighborhood object. Accordingly, it is intended, therefore, that aspects of the present invention not be limited to the various example embodiments disclosed, but that the present invention includes all embodiments falling within the scope of the appended claims.

What is claimed is:

1. An apparatus for perceiving and reporting a neighborhood object located within a neighborhood area, the apparatus comprising:
    a message analysis unit to analyze information of an alive message received from the neighborhood object and to determine if the neighborhood object is located within a predetermined range inside the neighborhood area by comparing a receive sensitivity of the alive message with a threshold value;
    a neighborhood object information control unit to update status information on a location of the neighborhood object by adjusting a transmission cycle at which the neighborhood object transmits the alive message, based on whether the neighborhood object is located within the predetermined range; and
    a reporting unit to report the updated status information of the neighborhood object according to a reporting condition,
    wherein the neighborhood object information control unit requests the neighborhood object to adjust the transmission cycle of the alive message to be shorter than a previous transmission cycle, when the receive sensitivity does not exceed the threshold value.

2. The apparatus as claimed in claim 1, wherein the alive message comprises one or more of the transmission cycle, a message retransmission cycle, and neighborhood object identification information.

3. The apparatus as claimed in claim 1, wherein the status information comprises one or more of:
    information on whether the neighborhood object has entered the neighborhood area;
    information on when the neighborhood object has entered the neighborhood area;
    information on whether the neighborhood object has resided in the neighborhood area;
    information on how long the neighborhood object has resided in the neighborhood area;
    information on whether the neighborhood object has left the neighborhood area; and
    information on when the neighborhood object has left the neighborhood area.

4. The apparatus as claimed in claim 1, wherein the message analysis unit determines if the neighborhood object leaves the neighborhood area by comparing the receive sensitivity of the alive message, included in the information received from the neighborhood object, and a retransmission frequency of the alive message, included in the information received from the neighborhood object, with a threshold value.

5. The apparatus as claimed in claim 4, wherein the neighborhood object information control unit requests the neighborhood object to adjust the transmission cycle of the alive message to be shorter than a previous transmission cycle based on a comparison of the receive sensitivity and the retransmission frequency with the threshold value.

6. The apparatus as claimed in claim 4, wherein the neighborhood object information control unit requests the neighborhood object to change the transmission cycle of the alive message to a predetermined value based on a comparison of the receive sensitivity and the retransmission frequency with the threshold value.

7. The apparatus as claimed in claim 4, wherein the neighborhood object information control unit changes the transmission cycle of the alive message to a predetermined value based on a comparison of the receive sensitivity and the retransmission frequency with the threshold value and transmits the changed transmission cycle to the neighborhood object.

8. The apparatus as claimed in claim 1, wherein the neighborhood object transmits status information of another neighborhood object to the neighborhood object information control unit.

9. The apparatus as claimed in claim 1, wherein the reporting condition stipulates one or more of:
    reporting the status information when each of a plurality of specified neighborhood objects enter or reside in the neighborhood area;
    reporting the status information when any one of the plurality of neighborhood objects enters or resides in the neighborhood area;
    reporting the status information when any one of neighborhood objects entering or residing in the neighborhood area is not included in the plurality of specified neighborhood objects;
    reporting the status information when each of the plurality of specified neighborhood objects leaves the neighborhood area;
    reporting the status information when any one of the plurality of specified neighborhood objects leaves the neighborhood area; and
    reporting the status information when one or more of the plurality of specified neighborhood objects reside in the neighborhood area for at least a given time period.

10. A method of perceiving and reporting a neighborhood object located within a neighborhood area, the method comprising:
    analyzing information of an alive message received from the neighborhood object and determining if the analyzed information is located within a predetermined range inside the neighborhood area by comparing a receive sensitivity of the alive message with a threshold value;
    updating status information on a location of the neighborhood object by adjusting a transmission cycle at which the neighborhood object transmits the alive message, based on whether the neighborhood object is located within the predetermined range; and
    reporting the updated status information of the neighborhood object according to a reporting condition,
    wherein the transmission cycle of the alive message is adjusted to be shorter than a previous transmission cycle, when the receive sensitivity does not exceed the threshold value.

11. The method as claimed in claim 10, wherein the alive message comprises one or more of the transmission cycle, a message retransmission cycle, and neighborhood object identification information.

12. The method as claimed in claim 10, wherein the status information comprises one or more of:
    information on whether the neighborhood object has entered the neighborhood area;
    information on when the neighborhood object has entered the neighborhood area;
    information on whether the neighborhood object has resided in the neighborhood area;

information on how long the neighborhood object has resided in the neighborhood area;

information on whether the neighborhood object has left the neighborhood area; and information on when the neighborhood object has left the neighborhood area.

13. The method as claimed in claim 10, wherein the analyzing of the information of the alive message and the determining if the analyzed information lies within the predetermined range comprises determining if the neighborhood object leaves the neighborhood area by comparing the receive sensitivity of the alive message and a retransmission frequency of the alive message with a threshold value.

14. The method as claimed in claim 13, wherein the updating of the status information of the neighborhood object comprises requesting the neighborhood object to adjust the transmission cycle of the alive message to be shorter than a previous transmission cycle based on a comparison of the receive sensitivity and the retransmission frequency with the threshold value.

15. The method as claimed in claim 13, wherein the updating of the status information of the neighborhood object comprises requesting the neighborhood object to change the transmission cycle of the alive message to a predetermined value based on a comparison of the receive sensitivity and the retransmission frequency with the threshold value.

16. The method as claimed in claim 13, wherein the updating of the status information of the neighborhood object comprises changing the transmission cycle of the alive message to a predetermined value based on a comparison of the receive sensitivity and the retransmission frequency with the threshold value, and transmitting the changed transmission cycle to the neighborhood object.

17. The method as claimed in claim 10, further comprising:

receiving status information of another neighborhood object from the neighborhood object.

18. The method as claimed in claim 10, wherein the reporting condition stipulates one or more of:

reporting the status information when each of a plurality of specified neighborhood objects enter or reside in the neighborhood area;

reporting the status information when any one of the plurality of neighborhood objects enters or resides in the neighborhood area;

reporting the status information when any one of the neighborhood objects entering or residing in the neighborhood area is not included in the plurality of specified neighborhood objects;

reporting the status information when each of the plurality of specified neighborhood objects leaves the neighborhood area;

reporting the status information when any one of the plurality of specified neighborhood objects leaves the neighborhood area; and reporting the status information when one or more of the plurality of specified neighborhood objects reside in the neighborhood area for at least a given time period.

\* \* \* \* \*